United States Patent
Cho et al.

(10) Patent No.: US 6,332,156 B1
(45) Date of Patent: *Dec. 18, 2001

(54) E-MAIL PROCESSING METHOD

(75) Inventors: Won-bong Cho; Sang-youl Lee, both of Seongnam; Ho-woong Hwang, Incheon, all of (KR)

(73) Assignee: Samsung Electronic Co., Ltd., Kyungki-Do (KR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/064,596

(22) Filed: Apr. 23, 1998

(30) Foreign Application Priority Data

Jul. 15, 1997 (KR) .................................. 97-32931

(51) Int. Cl.[7] .......................... G06F 15/16; G06F 13/00
(52) U.S. Cl. ...................... 709/206; 709/203; 709/218; 709/219; 709/246
(58) Field of Search .................... 370/407; 709/200–201, 709/205–206, 207, 217–219, 238, 227–228, 245–246; 707/10; 358/402–404, 442

(56) References Cited

U.S. PATENT DOCUMENTS

| | | | |
|---|---|---|---|
| 5,406,557 | * | 4/1995 | Baudoin ............................... 709/206 |
| 5,793,972 | * | 8/1998 | Shane .................................. 709/219 |
| 5,862,325 | * | 1/1999 | Reed et al. ........................... 709/201 |
| 5,898,835 | * | 4/1999 | Truong ................................. 709/217 |
| 5,903,723 | * | 5/1999 | Beck et al. ........................... 709/200 |
| 6,014,688 | * | 1/2000 | Venkatraman et al. .............. 709/206 |
| 6,085,224 | * | 7/2000 | Wagner ................................ 709/203 |
| 6,141,695 | * | 10/2000 | Sekiguchi et al. ................... 709/206 |
| 6,175,857 | * | 1/2001 | Hachiya et al. ...................... 709/206 |

FOREIGN PATENT DOCUMENTS

| | | | |
|---|---|---|---|
| 4-120647 | 4/1992 | (JP) | ................................ G06F/13/00 |
| 5-233493 | 9/1993 | (JP) | ................................ G06F/13/00 |
| 6-195278 | 7/1994 | (JP) | ................................ G06F/13/00 |
| 7-110792 | 4/1995 | (JP) | ................................ G06F/13/00 |
| A-9-198328 | 7/1997 | (JP) | ................................ G06F/13/00 |

* cited by examiner

*Primary Examiner*—Bharat Barot
(74) *Attorney, Agent, or Firm*—Sughrue, Mion, Zinn, Macpeak & Seas, PLLC

(57) ABSTRACT

An e-mail processing method for transmitting an activity program along with data, to thereby perform various forms of activities upon reception of e-mail. The sender first creates a message having a message header and a message body including data which is to be sent to a receiver. If the sender wishes to designate an activity for the receiver, the sender creates an activity program to perform the activity, attaches the activity program to the message, and sends the activity program along with the data. When the receiver receives the message, it is determined whether the activity program is attached to the received message. If the activity program is attached to the received message, the activity program is executed.

3 Claims, 2 Drawing Sheets

E-MAIL PROCESSING METHOD

BACKGROUND OF THE INVENTION

1. Field of the Invention

The present invention relates to an e-mail processing method, and more particularly, to an e-mail processing method for transmitting an activity program along with data. The present application is based upon Korean Application No. 97-32931, which is incorporated herein by reference.

2. Description of the Related Art

When sending conventional e-mail, a user inserts text or previously prepared data (document, audio, image and/or video data) into a message body, and data information into a message header, using a keyboard. When the e-mail is delivered, a receiver reads the text sent by the sender, saves various forms of data from the message body onto a hard disk, or reviews the text with an application program. However, in conventional e-mail methods, only data is sent to the receiver, and the sender cannot designate the processing of the sent data.

SUMMARY OF THE INVENTION

To solve the above problem, it is an object of the present invention to provide an e-mail processing method which can offer active e-mail services by sending activities and an activity-performing application program along with data.

To achieve the above object, there is provided an e-mail processing method in which a sender first creates a message having a message header and a message body including data which is to be sent to a receiver. If the sender wishes to designate an activity for the receiver, the sender creates an activity program to perform the activity, attaches the activity program to the message, and sends the activity program along with the data. When the receiver receives the message, it is determined whether the activity program is attached to the received message. If the activity program is attached to the received message, the activity program is executed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE PREFERRED EMBODIMENT

Figure 1:
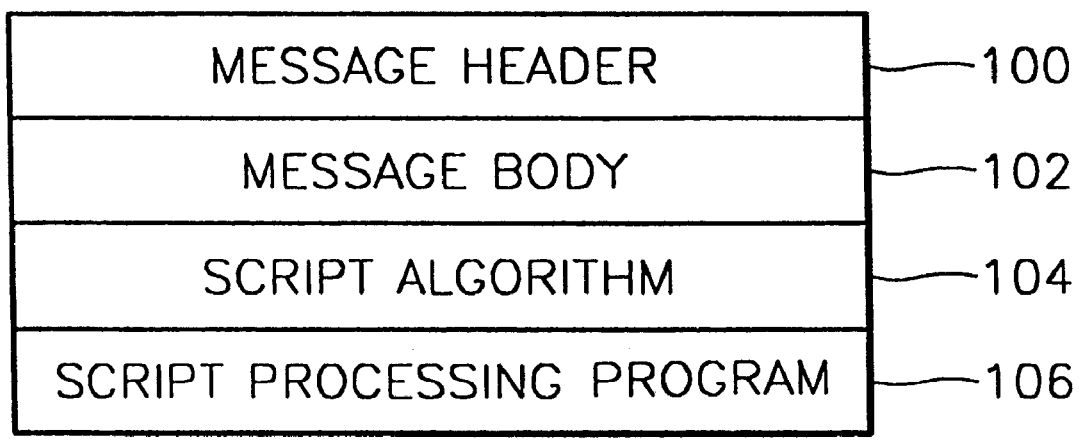
FIG. 1 illustrates an e-mail message structure according to the present invention.

Referring to FIG. 1, an e-mail message structure according to the present invention includes a message header 100 having information regarding other parts of the message, a message body area 102 having data that a sender wishes to send to a receiver, a script algorithm area 104 having an activity algorithm to be performed when the e-mail is received by the receiver, and a script processing program area 106 having a program for performing the script algorithm.

Figure 2:
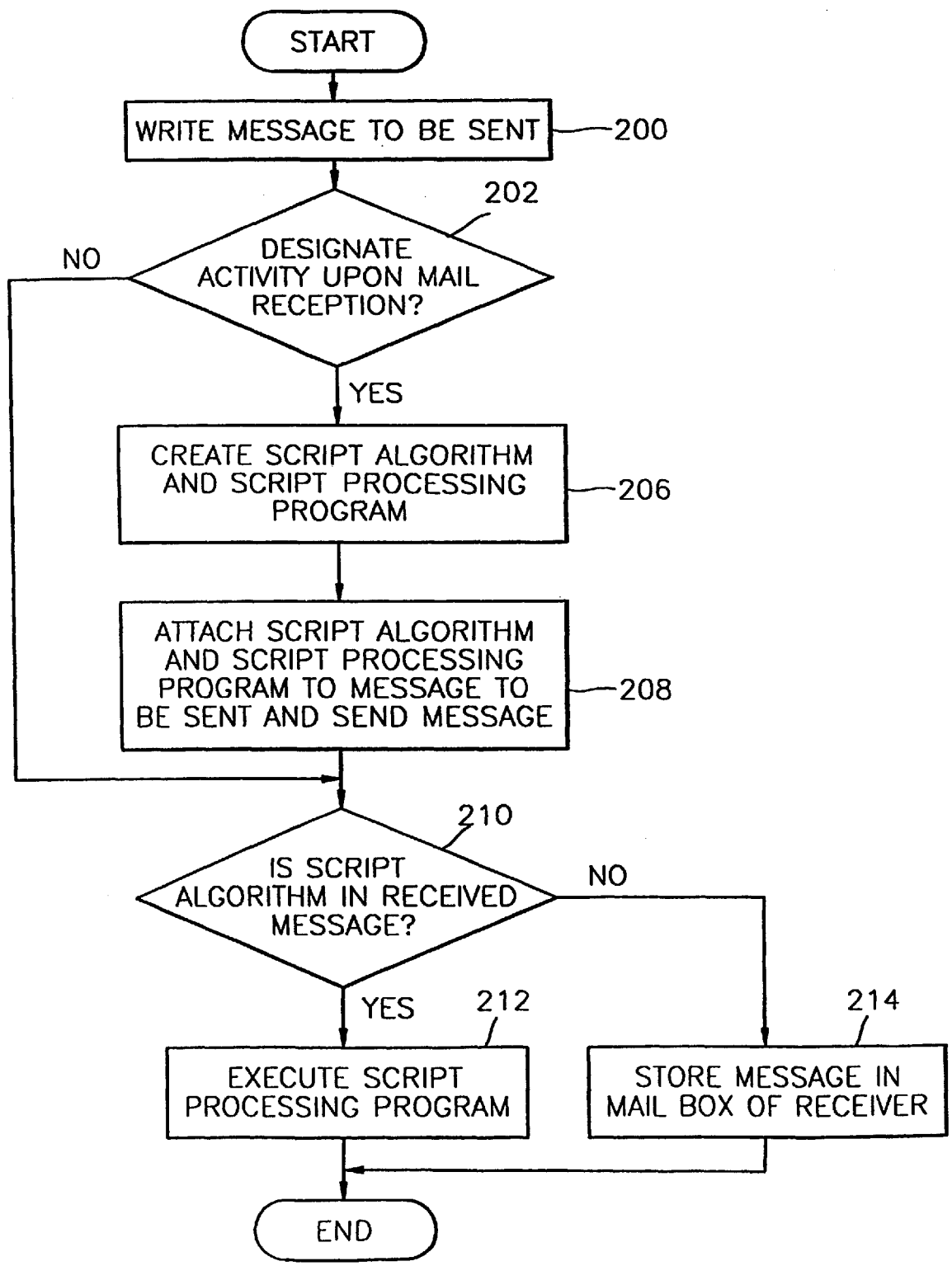
FIG. 2 is a flowchart of an e-mail processing method according to the present invention.

FIG. 2 illustrates a flowchart for processing e-mail according to the present invention. The e-mail processing method includes the steps of writing a message to be sent (step 200), determining whether an activity is to be designated (step 202), creating a message enclosed with a script algorithm and sending the created message (steps 206 to 208), confirming whether the script algorithm is enclosed in the received message (step 210), executing a script processing program (step 212), and storing the message in the receiver's e-mail box (step 214).

In step 200, the message to be sent is created. In step 202, it is determined whether an activity upon receiving the e-mail is to be designated. If an activity is not designated, only the message created in step 200 is sent. On the other hand, if an activity is designated, a script algorithm and a script processing program are created in step 206. The script algorithm, which is written in a high level language and can designate the activity, performs activities such as finding a file in the receiver's disk drive, or placing an automatic call in the absence of the receiver. For example, if the receiver does not immediately read the received e-mail, an algorithm for calling the receiver three minutes later can be made as follows.

If (three minutes pass after message reception) call receiver;

else, do nothing.

In step 208, the script algorithm and the script processing program are attached to the message created in step 200, and are sent with the message. The script processing program, which is written in a program language such as Java which is compatible with a wide range of systems, is transmitted through a network along with the other message parts.

When the e-mail is received by the receiver, it is determined in step 210 whether the script algorithm is included in the message by checking the received message head. If the e-mail message contains a script algorithm, the script processing program is executed in step 212. On the other hand, if there is no script algorithm in the e-mail message, the e-mail message is stored in the receiver's e-mail box in step 214.

According to the present invention, an activity-processing program is transmitted along with data by e-mail. Thus, various forms of activities can be performed when the e-mail is received and active e-mail reception is possible. In addition, electronic transactions can be performed via e-mail.

While the present invention has been illustrated and described with reference to a specific embodiment, further modifications and alterations which are within the spirit and scope of this invention will occur to those skilled in the art.

What is claimed is:

1. An e-mail message, which is created for sending to a recipient, comprising:
   a message header area;
   a message body area having data to be sent by a sender;
   an executable script algorithm area having a script algorithm to be performed when the e-mail message is received by the recipient; and
   a script processing program area having a script processing program for automatically performing the script algorithm.

2. The e-mail message as claimed in claim 1, wherein the script processing program is written in Java.

3. An e-mail processing method comprising the steps of:

creating a message having a message header and a message body, containing data to be sent to a recipient;

creating an executable script algorithm and a script processing program for perfoming an activity, attaching said script algorithm and said script processing program to said message, and sending said script algorithm and said script processing program along with said message to a recipient; and receiving said message, determining whether a script algorithm is attached to said received message, and automatically executing said script processing program if said script algorithm is attached to said received message.

* * * * *